United States Patent Office 3,408,690
Patented Nov. 5, 1968

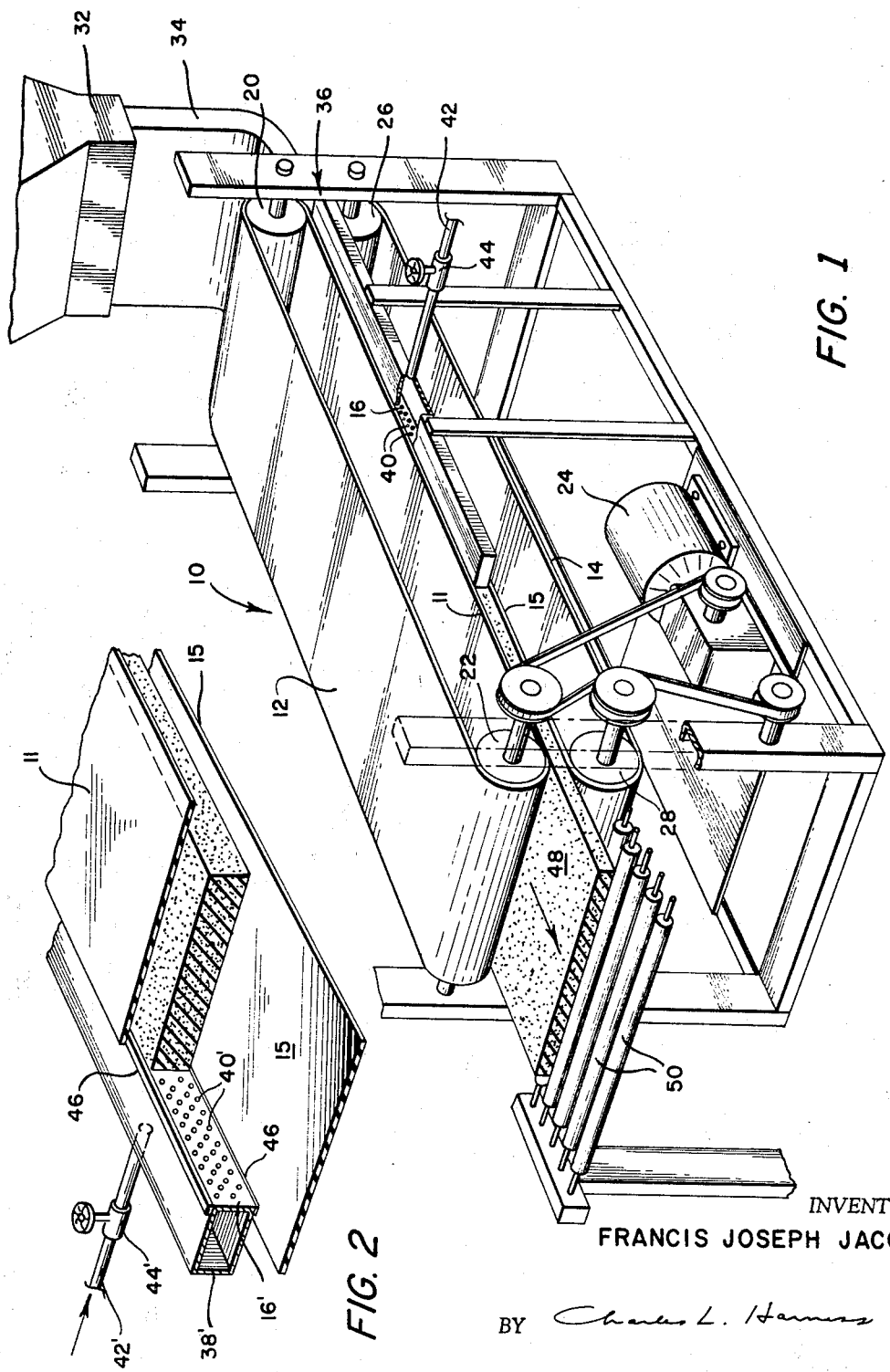

3,408,690
APPARATUS FOR MAKING FOAMED POLYMERIC STRUCTURES
Francis J. Jacob, New Castle, Pa., assignor to W. R. Grace & Co., a corporation of Connecticut
Filed Dec. 7, 1966, Ser. No. 599,906
9 Claims. (Cl. 18—4)

ABSTRACT OF THE DISCLOSURE

The disclosure relates to an apparatus for continuously expanding and foaming polymeric materials, such as polystyrene. Beads of the polymeric material containing a suitable blowing agent are heated in a molding channel provided by opposed continuous conveyors to cause softening of the polymer and evaporation of the blowing agent, with resultant expansion and foaming. The heating is achieved by the injection of steam at high velocities into the polymeric material through the side walls of the molding channel, which connect the opposed conveyors.

---

This invention relates to apparatus for making foamed polymeric structures. More particularly it relates to an apparatus for making foamed polymeric boards or sheets which includes improved means for applying steam to expandable beads of polymeric materials.

Many types of apparatus have been previously provided for continuous production of expanded thermoplastic polymeric materials. The starting materials expanded in such apparatus are generally compact granules or beads of expandable polymeric materials which contain a minor amount of a low boiling hydrocarbon blowing agent.

The expandable polymeric materials can comprise a wide variety of homopolymers and copolymers of vinyl monomers. Polystyrene is a preferred embodiment of such a polymeric material. The low boiling hydrocarbon incorporated in the expandable polymeric material is preferably an aliphatic or cycloaliphatic hydrocarbon having a boiling point in the range of about 35 to 60° C. Petroleum ether, pentane, hexane, cyclohexane and the like are exemplary of such low boiling hydrocarbons.

Prior art apparatus for expanding compact granules or beads of polymeric materials to produce boards or sheets of foamed product has generally included a molding space provided between a plurality of moving endless conveyor belts. Such apparatus has generally also contained suitable means for supplying the expandable material to the molding space, means for heating the expandable material within the space to cause it to expand, and suitable means for removing the expanded board or sheet from the molding space. Some prior art devices have also included cooling means for reducing the temperature of the expanded foam when the desired amount of expansion is achieved.

Continuous molding apparatus of this type achieve substantially increased efficiency of operation over batch-type molds which were at one time utilized for forming one board or sheet of polymeric foam at a time. Many problems have, however, arisen in the use of such prior art continuous apparatus, particularly in the provision of suitable heating means for expanding the foam in the continuously provided mold cavity. It has been proposed to heat the polymeric material to cause its expansion with various types of hot gases, with infrared lamps, with high frequency radio waves, and with steam. Steam is the preferred heating medium and has been most widely used in prior art devices, largely because of its relatively low cost and ready availability. Steam provides the heat required for the expansion and agglutinization of the individual beads of thermoplastic material into a unitary foam mass, and also condenses on the foamed material, eliminating disposal problems.

In the old batch-type foam board molding devices, steam was applied to the mold externally. Batch molding devices utilizing such external steam heat were prone to uneven heating of the polymeric material and hence to nonuniform expansion of the foam. In the continuous foam board molding apparatus of the prior art, steam is generally brought into direct contact with the expandable polymeric beads, either by forcing the steam through holes in one of the conveyors forming a portion of the continuous mold cavity, or by supplying steam directly to the bead of thermoplastic material through steam probes mounted between the endless belt conveyors forming the mold cavity.

Steam supply means of this type were found to interfere significantly with the efficient production of the desired foamed board or sheet product. When this prior art type of steam supply means was employed, it was not possible to use many desirable types of conveyors, such as woven belting, pallet type conveyors, and the like, because such conveyors could not be provided with the openings or holes necessary to allow steam to be forced through them and into contact with the expandable polymeric material in the molding cavity. Further, before typical solid band-type conveyors could be used in continuous foam production, it was necessary to perforate the conveyors to provide steam access holes, thereby increasing equipment costs and interrupting uniform continuity and smoothness of the major mold surfaces through the introduction of holes in the conveyors.

The probe-type steam supply means also created many problems, chiefly resulting from the tendency of the probes to stick to the expandable thermoplastic beads. Attempts to combat such sticking have included the use of specially constructed probes which are tapered and coated with lubricant. Further, the probe-type steam supply means are almost impossible to use in the continuous production of foam boards of small thicknesses, such as about 1 inch or less, where the presence of the probes produces void spaces in the expanded foam structure.

It is therefore a primary object of the present invention to provide a new and improved apparatus for the continuous production of foamed polymeric material which includes improved means for admitting steam to a continuous molding channel to expand and foam the polymeric material in the channel.

Another object of this invention is to provide a new and improved apparatus for the continuous production of boards or sheets of foamed polymeric materials that achieves efficient application of steam to expandable beads of the polymeric base material to heat and cause the expansion and fusion of such material.

Still another object of the present invention is to provide an apparatus for the continuous production of foamed polymeric materials that uses solid, unperforated, endless belts to create a continuous molding channel to confine and shape boards or sheets of the expanded polymeric materials.

Yet another object of this invention is to provide an apparatus for the continuous production of foamed polymeric boards or sheets that uses endless conveyor belts to create a portion of a continuous molding channel for the formation of such boards or sheets, and allows the application of steam to the expandable polymeric material between such endless belts without the need for holes in the belts themselves.

A further object of the present invention is to provide an apparatus for the continuous production of foamed polymeric boards and sheets that does away with the need for insertion of steam probes directly into the material being foamed.

A still further object of the present invention is to provide an apparatus for the continuous production of foamed polymeric boards and sheets that provides means for directly applying steam to the expandable materials used to produce such products and that can be successfully and efficiently used to produce expandable products having a thickness of about 1 inch or less.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

To achieve the foregoing objects and in accordance with its purpose, as embodied and broadly described, the foam board-forming apparatus of this invention comprises an open-ended molding channel defined by two opposed endless belts which are continuously movable in the same direction, and two channel-closing sides positioned normal to the endless belts to form with the belts a substantially closed channel extending in the direction of movement of the belts. The apparatus also includes means for supplying expandable beads of polymeric material to the molding channel at one open end of the channel, means for continuously supplying steam to the molding channel through at least one of the channel-closing sides, and means for removing the expanded polymeric material from the other end of the molding channel. The steam supply means brings steam into contact with the expandable polymeric material in the molding channel, to heat the material and cause it to expand as it is continuously moved away from the first open end of the channel by the endless belts.

The invention consists in the novel parts, constructions, arrangements, combinations and improvements shown and described. The accompanying drawings, which are incorporated in and constitute a part of this specification, illustrate one embodiment of the invention, and together with the description, serve to explain the principles of the invention.

Of the drawings:

FIG. 1 is a perspective view of one embodiment of the continuous foam board-forming apparatus of this invention, shown in schematic form.

FIG. 2 is a perspective view, partially in section, of another embodiment of the invention, illustrating in detail the structure and operation of the steam supply means of the present apparatus.

It is to be understood that both the foregoing general description and the following detailed description are exemplary and explanatory and are not restrictive of the invention.

Reference will now be made in detail to the present preferred embodiment of the invention, an example of which is illustrated in the accompanying drawings.

As shown in FIG. 1, the foam board-forming apparatus of this invention comprises a molding channel generally indicated at 10 in which compact granules or beads of expandable polymeric material are heated by subjection to steam, and expanded to form a unitary foamed mass having the shape and size of the molding channel. The expandable beads of polymeric material are supplied to molding channel 10 from hopper 32 through conduit 34, and the expanded foam board product 48 is removed from the molding channel by suitable removal means 50.

In accordance with the invention, a substantially closed molding channel is provided which has the size and shape of the desired foam board product. This channel contains means for continuously moving the expandable polymeric material away from a first end of the channel during its expansion and foaming; and also continuously supplys a new entrance portion of the molding channel which is available for the continuous introduction of additional expandable polymeric material into the channel.

As embodied and shown in FIG. 1, the continuous molding channel 10 includes upper and lower opposed endless conveyor belts 12 and 14. Top endless belt 12 extends over and between two rotatable drums 20 and 22 and is held tauntly around those drums and rotates evenly with them. The rotatable drum 20 is connected to a suitable source of power, such as motor 24, which drives the rotatable drum 20 and hence endless belt 12 in a direction of rotation which causes lower run 11 of endless belt 12 to continuously move in a direction away from the first open end 36 of molding channel 10 and toward downstream end 48 of the molding channel. This downstream end 48 is where the finished foam board product is removed from the apparatus.

In like manner, rotatable drum 28 is connected to a suitable source of driving power, such as motor 24, to drive endless belt 14 in a direction such that upper run 15 of endless belt 14 also continuously moves away from first open end 36 of molding channel 10. Driving means 24 is suitably regulated so that the speeds of endless belts 12 and 14 are the same, and the polymeric material being expanded in molding chamber 10 is thus moved through that chamber at a uniform speed through the cooperative efforts of endless belts 12 and 14.

As the polymeric material expands in the molding chamber it is confined vertically between lower run 11 of endless belt 12 and upper run 15 of endless belt 14. Belts 11 and 15 thus define the thickness of the board or sheet material produced in the molding channel. To this end belts 11 and 15 may be spaced any desired distance from each other by adjustably mounting endless belts 12 and 14 with respect to each other.

The desired residence time of the expanding material in molding channel 10 is dependent on the temperature of the heating medium, the thickness of the desired product, and the like. The speed of rotation of endless belts 12 and 14 can, of course, be suitably adjusted to afford any desired residence time to the polymeric material in molding channel 10.

The substantially closed molding channel 10 is further defined by two opposed channel-closing sides or walls 16 and 18 (not shown) which are positioned normal to endless belts 12 and 14 and extend away from upstream open end 36 of the molding channel in the direction of movement of endless belts 12 and 14. As embodied and shown in FIG. 1, these channel-closing sides comprise the stationary side walls 16 and 18 of molding channel 10. Side wall 16 is perforated, containing apertures 40, to enable steam to be supplied to molding channel 10 for heating and expanding the thermoplastic material therein, as will be more fully described hereinafter. The other side wall 18 (not shown) is a stationary continuous wall directly opposite side wall 16 which operates to confine within molding channel 10 the steam introduced into the channel through perforations 40 in channel-closing side 16. Side wall 16 and 18 also operate to confine the expanding foamed material within molding channel 10 and define the width of the final expanded foam board product. It will be understood that side wall 18 can also be a third endless belt positioned normal to endless belts 12 and 14 in a manner well known in the prior art.

As embodied, and shown in FIG. 1, molding channel 10 is thus defined between lower run 11 of endless belt 12, upper run 15 of endless belt 14 and channel closing side walls 16 and 18 (not shown).

Endless belts 12 and 14 may be constructed of any suitable material. No perforations are required in these endless belts, and hence they may be solid band-type conveyors, conveyors made of woven belting, pallet-type conveyors, or conveyors of any other desired construction. For example, the conveyor belt may suitably be made of stainless steel.

Side walls 16 and 18 may also be made of any suitable heat resistant material such as steel, ceramics, or heat and water resistant plastics. They, too, are advantageously constructed of stainless steel. Rotatable drums 20, 22 26 and 28 are conventional drums of any of the various types well known to those skilled in the art.

In accordance with the invention, means are provided for supplying expandable beads of polymeric material to molding channel 10 at a first open end thereof. As embodied and shown in FIG. 1, this bead supply means comprises a hopper 32, suitably connected to the upstream open end 36 of molding channel 10 through conduit 34.

It will be appreciated that any type of bead receiving receptacle can be substituted for hopper 32, and that any suitable means of conveying the expandable polymeric beads from the receptacle to open end 36 of molding channel 10 can be substituted for gravity-operated conduit 34. For example, instead of feeding the beads by gravity through conduit 34 to the molding channel, they may be conveyed by other suitable conveying means, such as for example, a screw conveyor. Introduction of the expandable beads into molding channel 10 could also be achieved by extending endless belt 14 from open end 36 to a point directly under hopper 32 so that the thermoplastic beads to be expanded in the molding channel fall directly onto this conveyor from hopper 32.

In accordance with the invention, means are provided for continuously supplying steam to molding channel 10 through at least one of the channel-closing side walls 16 and 18. This does away with the need for steam probes or holes in the endless belts or dynamic portion of the mold. The steam heats the expandable polymeric material in channel 10 and causes it to expand into the shape of the channel as it is continuosuly moved away from open end 36 by endless belt conveyors 12 and 14. The individual beads are fused into a unitary mass by the heating action of the steam.

As embodied, this steam supply means includes a steam chamber, indicated generally at 38, which is located adjacent perforated side wall 16. Steam chamber 38 may be of any desired shape, and is air tight except for the perforations in side wall 16.

In the present embodiment of the steam supply means, side wall 16 forms one wall of steam chamber 38 which comprises a rectangular box-type structure which is airtight except for the perforations in side wall 16. One face of the steam chamber, i.e., side wall 16, is in direct contact with the polymeric material in molding chamber 10 as this material expands.

The steam supply means of the apparatus of this invention also includes a conduit 42 which connects steam chamber 38 with a suitable source of steam under pressure (not shown). Steam supply conduit 42 is equipped with a suitable pressure reducing valve 44 on the steam inlet side of chamber 38. This valve allows a suitable steam pressure to be maintained in the steam chamber. The pressurized steam escapes from steam chamber 38 into the expandable polymeric material in molding chamber 10 at a high velocity through apertures 40 in side wall 16. Maintaining the supply of steam under suitable pressure allows the achievement of the desired high velocity steam injection into the expandable material in molding chamber 10. This high velocity injection provides complete penetration of the expandable material by the steam, and a resulting uniform heating of the expandable material.

The structure of the steam chamber is shown in more detail in FIG. 2 which shows a second embodiment of the present apparatus in which both channel closing side comprise perforated walls 16 and 16' of steam chambers 38 and 38'. In FIG. 2, a partially expanded polymeric material, such as polystyrene, abuts against perforated side wall 16' which itself forms one wall of steam chamber 38'. Steam inlet conduit 42' supplies steam from a remote source to steam chamber 38' at a pressure which is controlled and regulated by pressure reducing valve 44'. The top and bottom of the molding channel are defined, respectively, by lower run 11 of endless belt 12 and uppe run 15 of endless belt 14.

Only one side wall, perforated channel-closing side 16 is shown in FIG. 2. It will be understood that the othe channel-closing side is another perforated side wall 1 with attached steam chamber 38, as illustrated in FIG. 1 In this embodiment, steam is injected into the expandabl polymeric material through both of channel-closing side 16 and 16', if desired, thereby more readily assuring com plete and uniform penetration and heating of the thermo plastic material.

As shown in FIG. 2, the top and bottom of steam chamber 38' are fitted with insulating or wear strips 46 These insualting strips serve as a seal to prevent the los of steam between lower run 11 of endless belt 12 an upper run 15 of endless belt 14. Wear strips 46 also serve to support the endless belts and prevent direct contact o the belts with steam chambers 38 and 38'. They there by serve as a type of cushion to prevent wear of botl the belts and the steam chambers.

In accordance with the invention removal means ar provided for removing the expanded polymeric materia from the moding channel at the downstream end of th channel. As embodied and shown in FIG. 1, roller con veyor 46 receives the expanded polymeric foam produc exiting molding channel 10 through its downstream ope end, generally 48. This foam product has assumed th shape of the molding channel. Of course, any other suit able conveying means may be substituted for roller con veyor 46 to transport the foam board product away fron the molding channel.

In operation, and as best shown by reference in FIG 1, the expandable polymeric material to be foamed i inserted in hopper 32 by any suitable means, and is ther transported through conduit 34 to open end 36 of mold ing channel 10. The expandable polymer is supplied t molding channel 10 in the form of compact beads o granules. The transport means schematically represente by conduit 34 transports or forces the polymeric bead into molding channel 10. They are transported througl this channel by endless belts 12 and 14.

It will be understood that the speed of rotation of thes belts can be adjusted to any desired predetermined speed Generally, belt speeds of about 5 to 10 feet per minut are suitable. The distance between the upper and lowe walls of molding channel 10, defined by runs 11 and 1! of endless belts 12 and 14, and the distance between sid walls 16 and 18 of the channel are adjustable, so that foamed product of any desired width and thickness car be produced in the molding channel. The apparatus of thi invention is particularly well adapted to the productior of continuous foamed boards having a thickness of abou 1 inch or less.

As the expandable polymeric material passes througl molding channel 10 it is subjected to the action of higl velocity steam exiting from steam chamber 38, and i desired, an identical second steam chamber 38' attachec to the other side wall of the molding channel. The stean heats the expandable polymeric material to a tempera ture at which the thermoplastic polymer softens but doe not melt and the aliphatic hydrocarbon blowing agent in corporated in the expandable material flashes causing ex pansion and foaming of the polystyrene or other expand able polymeric material.

It will be readily appreciated by those skilled in th art that the temperature to which the polymeric materia is heated can be controlled by the amount of steam sup plied to the material. The temperature to which the ma terial should be heated depends largely on the density o the desired product. The lower the density of the desirec product, the higher the temperature to which the expand able material must be heated. It is generally desirable t heat the material to a uniform temperature between abou 100° C. and 150° C. and it has been found that sucl uniform heating can be achieved, utilizing the apparatu of this invention, by supplying the steam to molding channel 10 through apertures 40 at a pressure of about 4 to 5 p.s.i.g. Such a pressure is, of course, achieved by suitable regulation of pressure reducing valve 44 of FIG. 1. The precise pressure selected within this range will depend on the width of the material being treated, whether steam is being supplied to the material on one or two sides of the molding channel, and similar considerations.

As steam is supplied to the thermoplastic beads in molding channel 10, the beads expand to form the desired foam product. This expansion causes the thermoplastic material to exert a force against belts 12 and 14 and side walls 16 and 18, but this force is resisted by the side walls and by rollers 20, 22, 26 and 28, thereby conforming the shape and size of the expanded material to that of the interior of molding channel 10.

After the desired residence time of the material in the molding channel has been completed, the material is continuously transported out of molding channel 10 by endless belts 12 and 14 and deposited on suitable removal means, such as roller conveyor 46 on which it is transported for additional treatment or shipping or the like. The continuous material exiting molding channel 10 can be cooled by air blasts or the like, can be cut into sections of desired length, can be coated to afford fire proofing protection or the like, or can be subjected to any other conventional treatment procedures.

The perforations or apertures 40 in side wall 16 (and also in side wall 16′ if a double steam application application apparatus is used) are of any suitable size to achieve the desired steam injection velocities into the expandable thermoplastic materials being treated. For example, perforations about 3/64 to 3/32 inch have been found to be satisfactory. It will be readily appreciated by those skilled in the art that many varying sized perforations can be suitably used.

The present apparatus can be used to produce sandwich type paneling materials which comprise foamed polymeric boards or sheets sandwiched between conventional facing materials. Thus, sheets of such facing materials as paper and sheet metal can be appropriately supplied immediately beneath lower run 11 of endless belt 12 and immediately above upper run 15 of endless belt 14, and the expandable polymeric materials charged to molding space 10 and expanded between these facings to form a composite sandwich type product. The facing materials can be supplied to molding channel 10 from rollers by conventional means well known to those skilled in the art.

In accordance with the invention, a new and improved apparatus for the production of foamed polymeric boards or sheets has been provided. This apparatus allows the production of outstanding foamed products, achieves improved operating efficiency, and reduces equipment expense by allowing almost any type of conventional conveyor belt to be used to form its endless molding channel. This apparatus utilizes the area between the endless belts which form the continuous molding channel to supply the steam necessary to fuse expandable thremoplastic beads into finished foam board products.

The invention in its broadest aspects is not limited to the specific details shown and described, but departures may be made from such details within the scope of the accompanying claims without departing from the principles of the invention and without sacrificing its chief advantages.

What is claimed is:

1. An apparatus for forming foamed polymeric structures from expandable beads of polymeric material, which comprises:

(a) an open-ended molding channel defined by two opposed endless belts which are continuously movable in the same direction, and two channel-closing sides positioned normal to said endless belts to form with said belts a substantially closed channel extending in the direction of said movement;

(b) means for supplying the expandable beads of polymeric material to said molding channel at a first open end thereof;

(c) means for continuously supplying steam to said molding channel through at least one of said channel-closing sides, to heat said expandable polymeric material in said channel and cause it to expand into the shape of said channel as it is continuously moved away from said first open end by said endless belts; and (d) removal means for removing the expanded polymeric material from said molding channel at a second open end thereof.

2. The apparatus of claim 1 in which at least one of said channel-closing sides contains a plurality of apertures therein and said steam supply means includes a steam chamber adjacent said perforated wall and a conduit connected to a source of steam for supplying steam to said steam chamber under pressure, whereby the steam escapes from the steam chamber through the apertures in said channel-closing side at a high velocity and penetrates throughout the expandable material in said molding channel.

3. The apparatus of claim 2 in which said steam supply means includes a pressure reducing valve in the proximity of the inlet to the steam chamber to allow control and variation of the pressure under which the steam is admitted to said steam chamber.

4. The apparatus of claim 2 in which both of said channel-closing sides contain a plurality of apertures and steam chambers are located adjacent both of said perforated channel-closing sides.

5. The apparatus of claim 2 in which a wear strip is provided between the ends of said perforated channel-closing side and said endless belts to prevent the escape of steam from said molding channel.

6. The apparatus of claim 2 in which said endless belts are disposed horizontally, and one of said endless belts is spaced a predetermined vertical distance from the other endless belt to provide the top and bottom members of said molding channel, said predetermined distance being the thickness of the expanded polymeric material.

7. The apparatus of claim 6 in which said predetermined distance is not greater than about 1 inch.

8. The apparatus of claim 2 in which only one of said channel-closing sides is perforated, the other channel-closing side is a stationary continuous wall.

9. The apparatus of claim 2 in which only one of said channel-closing sides is perforated and the other channel-closing side is an endless belt.

References Cited

UNITED STATES PATENTS

| | | | |
|---|---|---|---|
| 2,866,730 | 12/1958 | Potchen et al. | 18—4 |
| 3,065,500 | 11/1962 | Berner | 18—4 |
| 3,142,864 | 8/1964 | Pelley | 18—4 |
| 3,178,768 | 4/1965 | Edberg | 18—4 |
| 3,200,437 | 8/1965 | Sasanko | 18—4 |
| 3,262,151 | 7/1966 | Oxel | 18—4 |

WILLIAM J. STEPHENSON, *Examiner.*